Figure 11:
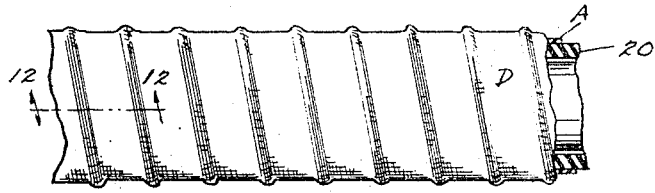

Nov. 1, 1949     R. E. ROBERTS     2,486,763
APPARATUS FOR MAKING FLEXIBLE TUBES
Filed June 19, 1944     4 Sheets-Sheet 1
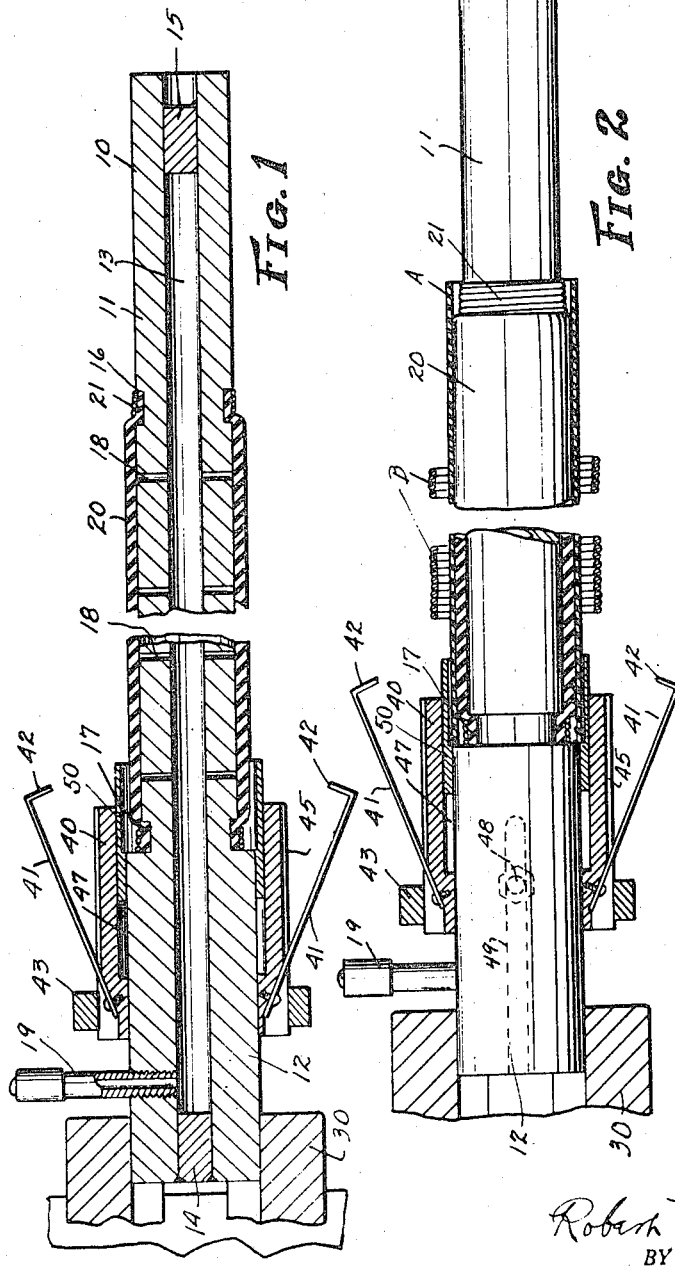
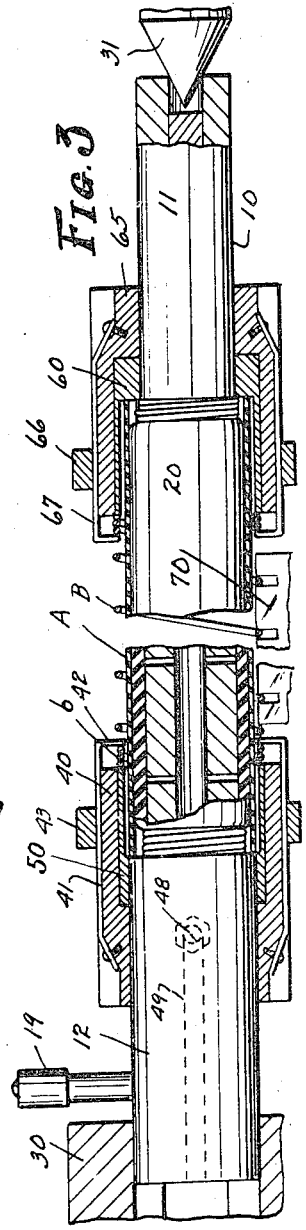
INVENTOR.
Robert Eldon Roberts,
BY
Bates Teare & McBean
Attorneys

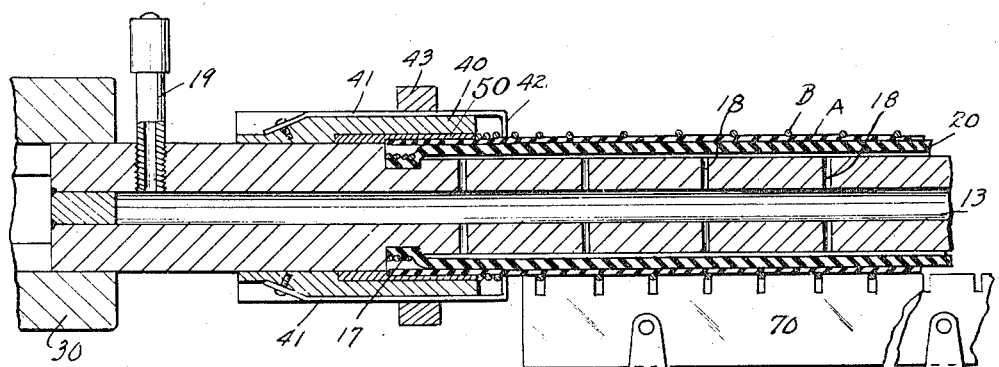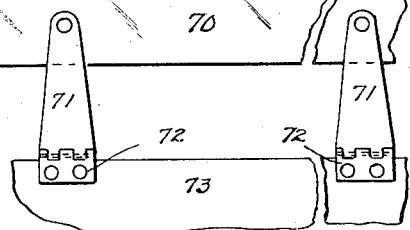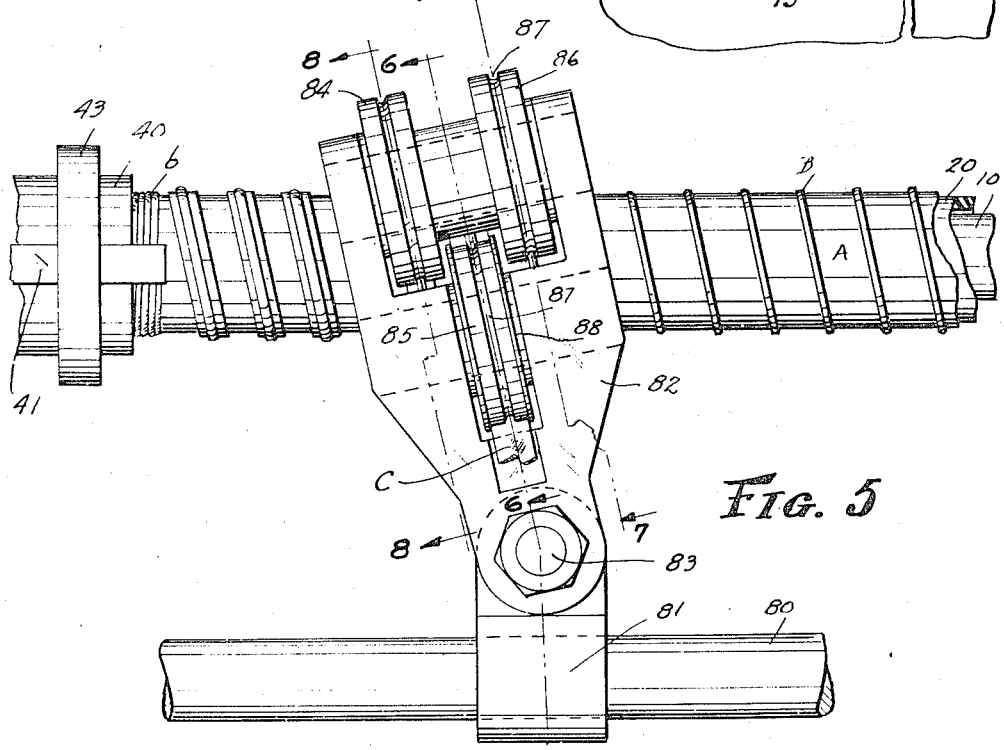

Nov. 1, 1949     R. E. ROBERTS     2,486,763
APPARATUS FOR MAKING FLEXIBLE TUBES
Filed June 19, 1944     4 Sheets-Sheet 3
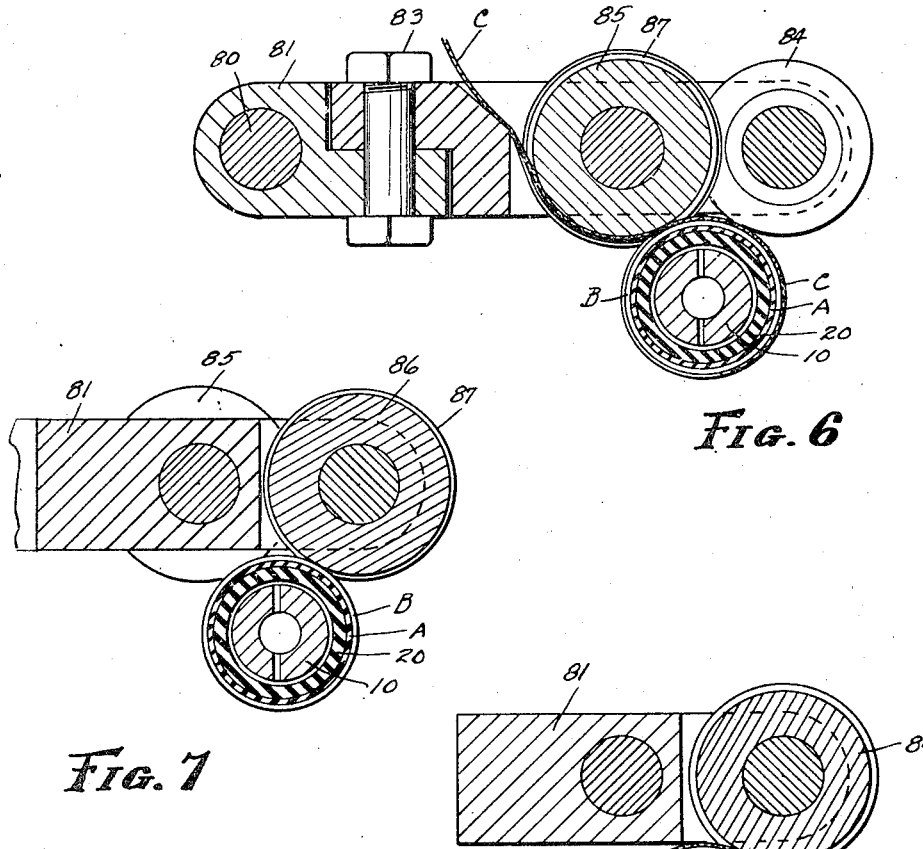
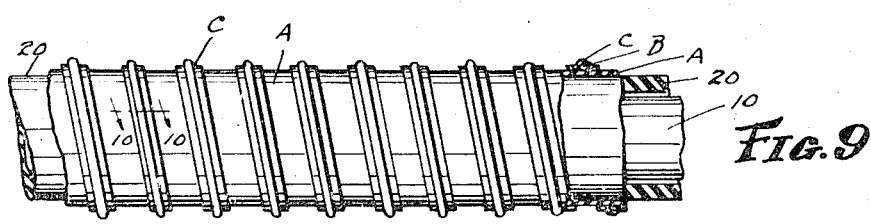
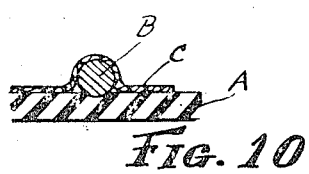
INVENTOR.
Robert Eldon Roberts,
BY
Dalis, Pearc & McBean
Attorneys Nov. 1, 1949 — R. E. ROBERTS — 2,486,763
APPARATUS FOR MAKING FLEXIBLE TUBES
Filed June 19, 1944 — 4 Sheets-Sheet 4

INVENTOR.
Robert Eldon Roberts
BY
Bates, Teare & McLean
Attorneys

UNITED STATES PATENT OFFICE 2,486,763

APPARATUS FOR MAKING FLEXIBLE TUBES

Robert Eldon Roberts, Ridgefield, Conn.

Application June 19, 1944, Serial No. 541,101

17 Claims. (Cl. 154—7)

This invention relates to an apparatus for manufacturing flexible non-collapsible tubes, as well as for the method of manufacture, in which such apparatus may be employed. The tube has an inwardly and outwardly corrugated flexible wall reinforced by a helical member surrounding the axis of the tube and embedded in the wall thereof, so that the tube while non-collapsible may be axially stretched or compressed or flexed in any direction.

My apparatus is well adapted for producing the flexible non-collapsible tubes shown, described and claimed in the copending application of Fred T. Roberts, No. 481,407, filed April 1, 1943, now Patent No. 2,396,059, dated March 5, 1946. A preferred form of such a tube comprises an inner yielding impervious tubular member; an embracing helical spring stretched from its normal condition but less than to its elastic limit, so that it is further extendable or compressible; a winding of rubberized tape in a helical course covering the turns of the spring, and a final elastic sheath outside of the spring and tape. The wall between successive turns of the spring is diverted inwardly to corrugate the tube leaving the spring at the crest of the outer corrugations.

It is an object of my invention to provide efficient means for holding the stretched spring in position over the inner tube during the manufacture; to provide for the forcing of such tube outwardly against the surrounding spring while the same is properly positioned with its coils spread along the tube; and to provide means for placing a spiral winding of rubberized tape over the positioned coils of the spring and firmly binding such tape to the tube. It is also an object of the invention to provide for readily releasing the carcass comprising the inner tube, stretched spring and surmounting tape from the forming apparatus, enabling it to be readily transferred to other apparatus where the diverting operation to corrugate the tube may be effected and the vulcanization completed.

A preferred form of my apparatus is illustrated in the drawings hereof and is hereinafter more fully described and the essential novel features are summarized in the claims.

Figure 12:
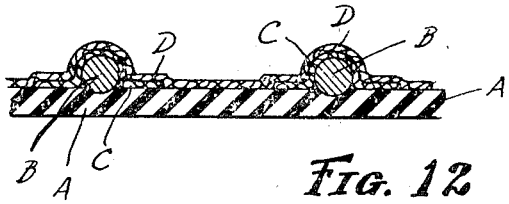
Figure 13:
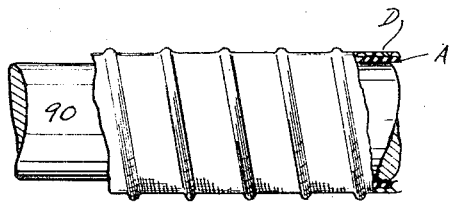
Figure 14:
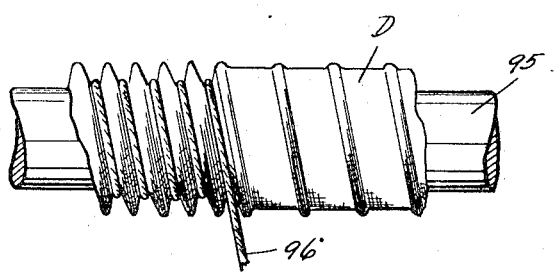
Figure 15:
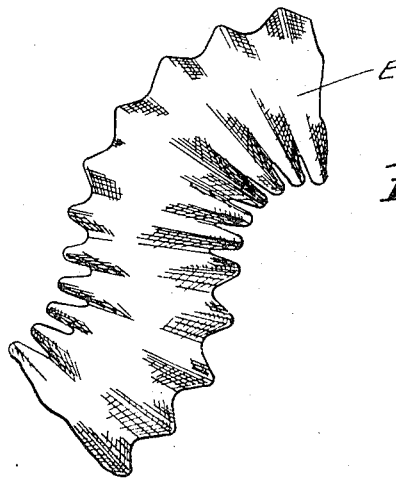

In the drawings, Fig. 1 is an axial section through a portion of my apparatus comprising a pneumatic mandrel on which the foundation tube may be mounted and the spring applied, this view showing a clamp in open position for one end of the spring; Fig. 2 is a side elevation of the apparatus of Fig. 1 showing in section a foundation tube in place and the coiled spring surrounding the same adapted to be stretched; Fig. 3 is a view similar to Figs. 1 and 2 showing the apparatus after the coiled spring has been stretched to position it about the foundation tube, this view showing the clamps for the two ends of the spring, these clamps being in closed position; Fig. 4 is a fragmentary view showing the pneumatic mandrel of Figs. 1, 2 and 3, after the same has been expanded by internal air pressure to cause the foundation tube to seat tightly against the spring; Fig. 5 is a plan of a portion of my apparatus concerned with applying the helical course of tape to the foundation tube and helical spring, this view showing such tube and spring in position on the expanded pneumatic mandrel substantially as shown in Fig. 4; Figs. 6 to 8 are details in vertical section of the portion of the apparatus concerned with applying the helical course of tape, these sections being taken on the correspondingly numbered lines on Fig. 5; Fig. 9 is an elevation, partly in section, illustrating the condition of the tube after the tape has been applied; Fig. 10 is a detail in enlarged cross section through one of the turns of the spring, the adjacent portion of the foundation tube and tape, the location being illustrated for instance by the line 10—10 on Fig. 9; Fig. 11 is a view similar to Fig. 9 showing the same reinforced tube after a sheath of stockinet has been placed about the taped coils; Fig. 12 is a detail in enlarged section through two adjacent turns of the carcass in Fig. 11, as indicated for instance by the line 12—12 in that figure; Fig. 13 is a view illustrating the tube of Fig. 11 after it has been removed from the pneumatic mandrel of that figure and placed on a metal mandrel for a slight preliminary vulcanization; Fig. 14 is a side elevation illustrating the carcass of Fig. 13 placed on a still smaller mandrel and in the act of having the corrugations formed by a helical winding of cord pressing the tube against the mandrel; Fig. 15 is a perspective of a portion of the finished tube, illustrating its extendability, compressibility and flexibility.

Referring first to Figs. 1 to 5 inclusive, 10 indicates a tubular mandrel rod having a body portion 11 in cylindrical form and a cylindrical head portion 12 of greater diameter. An axial bore 13 extends through this member but is plugged adjacent the ends of the member, the plugs being indicated at 14 and 15 in Fig. 1. Surrounding the intermediate portion of the body 11 of this hollow mandrel is a rubber tubular member 20, the ends of which extend into annular recesses 16 and 17 in the body 11 in which such ends are clamped, by embracing wire windings 21. Radial passageways 18 extend from the bore 13 outwardly to the interior of the embracing tubular member 20. From this it will be seen that compressed air admitted to the interior bore of the metal mandrel may expand the yielding tube 20, so that such tube becomes in effect a pneumatic mandrel.

To effect the application of compressed air to the pneumatic mandrel, I provide a filling nipple 19 in the head 12 leading from the exterior to the bore, this nipple having an internal check valve, after the manner of an ordinary tire filling nipple. Accordingly, the application of an air hose to the nipple 19 may supply compressed air to the interior of the pneumatic mandrel to expand the same to effect the results hereinafter explained.

The head portion of the mandrel 10 is adapted to be mounted in the chuck of a tool similar to an ordinary lathe. Such chuck is indicated at 30 in Figs. 1 to 4, and is adapted to embrace the mandrel tightly enough to support it and to rotate it when the chuck rotates. I provide a conical supporting member 31, Fig. 3, corresponding to the tail stock of a lathe, which may enter an axial recess in the mandrel at the other end from the chuck. This tail stock is so mounted that it may be swung out of the way to allow access to the mandrel.

In Figs. 2, 3 and 4, A indicates a rubber tube which is to form the foundation of my reinforced tube. This foundation tube may be manufactured in any suitable manner and is partially cured so that it may be readily drawn over the unexpanded pneumatic mandrel 20 into the position shown in Fig. 2, it being understood that the tail stock would be moved to idle position to allow the foundation tube to be drawn over that end of the mandrel while the head of the mandrel is in the chuck.

B in Fig. 2 indicates a helical spring preferably of steel, which is placed in a comparatively closed condition about the foundation tube on the pneumatic mandrel. After this has been effected, I stretch the spring and anchor its two ends to two clamps, mounted on the metal mandrel 10, as will now be described.

One of the clamps mentioned, shown in Figs. 1 to 5, comprises a sleeve 40 slidably on the head portion 12 of the mandrel. This sleeve carries a pair of diametrically opposed spring arms 41, each having an inwardly extending hooked end 42. A ring 43 slidably mounted on the exterior of the sleeve 40 may be moved across the spring arms to bend them inwardly so that they lie in longitudinal grooves 45 in the sleeve 40, as indicated in Fig. 3. In this position the inwardly bent ends 42 of the spring arms may engage coils of the spring to anchor it.

It is desirable to leave a portion of the foundation tube A at each end thereof uncovered by the spring so that such end portions are available for bushings or other fittings desired for the ends of the tube. To provide for this, I mount a thin cylindrical sleeve 50 on the head 12 of the mandrel and I provide an annular recess 47 in the sleeve 40 for this tubular shield. The bore in the shield is somewhat enlarged beyond the portion which rides on the mandrel head. Thus a recess is provided into which the foundation tube may extend.

After the foundation tube has been placed on the pneumatic mandrel, the shield 50 is shifted axially to overlie the end portion of the foundation tube and protect it, as indicated in Fig. 2. The clamping member is shifted lengthwise to cause the ends 42 to overhang the spring and these ends are then forced together by movement of the clamping ring 43 so that the inwardly projecting ends 42 pass between adjacent coils of the spring and bind two or three turns of the spring between such ends and the end of the shield 50, the parts at that time being in the position shown in Fig. 3. In this position the sleeve 40 is at the limit of its movement on the mandrel, determined by a pin 48 on the sleeve reaching the end of a groove 49 in the mandrel, as shown in dotted lines in Fig. 3. Thus that end of the spring is effectively anchored in the desired position over the foundation tube A, which overlies the pneumatic mandrel 20.

At the time when the tail stock 31 is free from the mandrel, I slide onto the free end of the mandrel another shield 60 and another clamp 65. This shield and clamp correspond to the shield 50 and clamp 40 heretofore described and have substantially the same external dimensions, though the bore of the shield and clamp are reduced to slide on the narrower portion 11 of the mandrel. The shield 60 is slid into position overhanging that end of the foundation tube and then the clamp 65 is brought into position and its ring 66 slid to force the clamping arms 67 inwardly to engage the endmost coils of the spring and anchor that end, as shown in Fig. 3, whereupon the clamp 65 is clamped tightly to the mandrel.

It is to be understood that before the second clamp just described is applied, the spring has been stretched to the desired open position which is less than the stretching permitted by the elastic limit of the material of the spring. The stretching, however, allows the coils to be well spaced from each other, as shown in Fig. 3.

To insure an accurate spacing of the spring coils, I apply a gauge 70, Fig. 3, which is a bar having a series of equidistant notches having the same spacing as that desired for the spring. This bar is carried by strap hinges 71 (Fig. 4) the other leaves 72 of which are secured to a stationary part 73 of the machine. When the spring has been stretched manually to the desired condition, and the final clamp locked, the gauge is manually lifted into active position and any particular coil is manually shifted in one direction or the other, as may be necessary to accurately space all of the coils.

After the spring has been positioned and properly spaced, as described, the next step in the operation is to admit compressed air through the nipple 19 into the interior of the mandrel, this air acting outwardly to force the foundation tube snugly against the surrounding coils B of the spring, as clearly indicated in Fig. 4. The comb 70 is maintained in position during this outward forcing, so that the proper position of the coils is insured as they come to be engaged by the foundation tube, due to the outward action of the pneumatic mandrel.

After the embracing spring has been anchored and snugly engaged by the foundation tube, as described, producing the carcass illustrated in Fig. 4, the comb 70 is removed and the chuck 30 is rotated to effect an application of the rubberized tape in a helical course over the spring. This tape is applied mechanically by the mechanism illustrated in Figs. 5 to 8, about to be described, and results in the tape being wound in a helical course about the tube directly over the spring and adhering to the foundation tube, as such tube and spring are rotated by the rotation of the chucked mandrel.

In Fig. 5, I have shown a frame rod 80, parallel with the mandrel, on which is slidably mounted a block 81 to which is pivoted a yoke 82 by a transverse pivot bolt 83. In the yoke are mounted three grooved rollers 84, 85, 86. The rollers 84 and 86 are on the same axis and may be in the nature of the single spool. These two rollers have cylindrical surfaces each centrally interrupted by an annular groove 87. The roller 85 is placed on an axis parallel with that of the rollers 84 and 86 and nearer the pivot 83 and extends into the space between the rollers 84 and 86. This roller 85 has a cylindrical surface and a central groove 87 and also has edge flanges 88. These flanges are spaced apart a distance slightly greater than the width of the tape which is to be applied by this roller. This tape, having its threads on the bias, is indicated at C in Fig. 5 and comes from a supply not shown and extends onto the underside of the roller 85, and thence across the tube, as about to be explained.

The three rollers are so positioned that their annular grooves are just the same distance apart as the coils of the spring to be covered with tape. The roller 86 is designed to engage a bare coil of the spring and provides means for automatically shifting the laying device as the tube turns on its axis. The roller 85 then overlies the adjacent turn of the spring, and the tape, indicated at C, coming from a suitable supply and preliminarily attached at its free end to the tube, is thus supplied directly to the coil of the spring next to the bare coil engaged by the roller 86. The third roller 84 overlies the third turn of the spring and serves to roll down the tape at opposite sides of a spring coil and effectively bind it to the foundation tube.

It will be seen from Fig. 5 that after the operation has been started the engagement of the foremost roller 86 with the bare coil of the wire spring causes the whole yoke and the parts it carries to be advanced along the tube, while the roller 95 is laying a course of tape over the preceding turn of the spring and the roller 84 is pressing that tape inwardly firmly onto the foundation tube on opposite sides of the wire.

It will be seen that when the tube with its wire coil has been given as many rotations as there are free coils to be covered there will result a tube with each coil covered by a helical course of tape bound down to the foundation tube, as indicated in Figs. 9 and 10.

The next step in the operation of my apparatus is to remove the tape applying means and also to move the tail stock to idle position, and to apply over the taped spring a stockinet sheath. It is to be understood that the exterior of the foundation tube and of the applied helical tapes are first covered with cement and then a sheath of stockinet D is drawn over the exterior of the taped tube producing the construction illustrated in Figs. 11 and 12.

At this stage, I wish to give the carcass thus formed a preliminary vulcanization to bind all the parts together. To effect this I open the valve in the filling nipple 19 releasing the compressed air from the interior of the pneumatic mandrel, which thus passes back to the original contracted form (as in Fig. 1) and leaves the completed carcass ready for easy removal over the free end of the mandrel. I then slide this carcass onto a metal mandrel 90 which just fits the interior of the tube, as illustrated in Fig. 13 and give the carcass a short vulcanization, just sufficient to bind the parts together. In this vulcanization I may employ a spiral winding cloth between the coils to insure the snug binding of the stockinet onto the foundation tube.

I now take the completed carcass, place it on a smaller mandrel, indicated at 95 in Fig. 14, and form corrugations in the tube by winding a coil of heavy cord 96 about the tube between successive reinforced turns. This brings the interior of the tube down tight onto the mandrel 95, leaving the coils of the spring embedded in the outer crests of the tube. The vulcanization of the tube is completed while it is in this condition. Thereafter the tube is removed from the mandrel 95 and it is thus in the condition indicated at E in Fig. 15. It is extendable and compressible and flexible in any direction, as shown in that figure. Whatever bushings and fittings are desired at the ends of the tube are now put in place and the article is thus completed.

Reference is made to my divisional application No. 563,280, filed November 13, 1944, for claims on a method of making flexible tubes which may employ all or part of the apparatus of this application.

I claim:

1. A rotatable hollow mandrel, an impervious yielding sheath surrounding the mandrel and attached thereto at the ends of the sheath, a passageway through the mandrel to the interior of the sheath, a clamp mounted on the mandrel and having spring arms with inwardly projecting portions adapted to engage coils of a helical spring surrounding the mandrel, and means for forcing said spring arms inwardly to effect such engagement.

2. In an apparatus for the manufacture of reinforced flexible tubes, the combination of a mandrel, an impervious yielding sheath mounted on the mandrel and secured at its ends thereto, means for admitting fluid under pressure through the mandrel to the interior of the sleeve, whereby a rubber tube surrounding the mandrel may be forced outwardly by the expansion of the mandrel, a pair of protecting sleeves slidably mounted on the mandrel and adapted to overhang the end portions of said rubber tubes, a pair of clamping sleeves slidably mounted on the mandrel and having annular internal recesses, whereby they may slide over said protecting sleeves, and means on the clamping sleeves for engaging and anchoring the end of a stretched helical spring surrounding the rubber tube between the facing ends of the protecting sleeves.

3. The combination of a mandrel having an expansible sheath adapted to support an embracing rubber tube, a pair of clamps slidably mounted on the mandrel for anchoring the ends of a stretched helical spring surrounding such rubber tube, an engaging device having a series of equi-distant notches adapted to receive the successive turns of the spring and position the same.

4. The combination of a pneumatic mandrel adapted to be embraced by a rubber tube, means for holding a helical reinforce about the tube, means for expanding the mandrel to seat the rubber tube against the reinforce and mechanism for automatically applying a fabric covering over the helical reinforce while the mandrel is expanded.

5. The combination of a rotatable mandrel, a pneumatic sheath embracing the mandrel and adapted to be itself embraced by a flexible tube to be reinforced, means for holding a helical reinforce about the tube, means for applying fluid under pressure to the interior of the sheath to force the same outwardly to force the tube against the reinforce, a traveling roller adapted to apply a tape in helical course to the reinforce while the sheath is expanded, and means controlled by the reinforce for advancing the roller.

6. The combination of a rotatable mandrel adapted to carry a flexible tube, means for holding a helical reinforce surrounding the tube and mandrel, a slidable bracket carrying a pair of rollers on mutually parallel axes, which axes are at an angle to the axis of the mandrel, one of said rollers having a groove adapted to bear on a bare portion of the helical reinforce, the other roller having flanges for guiding a strip of tape to an adjacent coil of said reinforce.

7. The combination of a mandrel adapted to carry a flexible tube, means for holding a helical reinforcing member about the tube, a tape-applying device including a slidable bracket carrying three rollers on axes at an angle to the mandrel axis, one of said rollers being adapted to engage a bare portion of said reinforcing member and control the travel of the bracket, another of said rollers being formed to feed a tape over the adjacent coil of said reinforcing member, and the third roller adapted to press such tape onto another coil of the member as the mandrel rotates.

8. A tape-applying machine of the class described comprising in combination, means for supporting and rotating a tube with a wire having spaced convolutions coiled thereabout, a carriage movable lengthwise of the tube and having a tape guide thereon for wrapping tape about the convolutions of wire as the tube is rotated, and means on the carriage for engaging the wire and propelling the carriage along the tube, said means effecting the relative longitudinal travel between the carriage and the tube for progressively spiraling the tape thereabout.

9. A tape-applying machine of the class described comprising in combination, means for supporting and rotating a tube with a wire having spaced convolutions coiled thereabout, a carriage movable lengthwise of the tube and having a tape guide thereon for wrapping tape about the convolutions of wire as the tube is rotated, and means on the carriage for engaging the wire for propelling the carriage along the tube, said last-named means comprising opposed rollers on the carriage bearing against the periphery of the tube, one of the rollers having a groove therein to engage the wire.

10. A tape-applying machine of the class described comprising in combination, means for supporting and rotating a tube with a wire having spaced convolutions coiled thereabout, a carriage movable lengthwise of the tube and having a tape guide thereon for wrapping tape about the convolutions of wire as the tube is rotated, and means on the carriage for propelling the carriage along the tube, said last-named means comprising opposed rollers on the carriage bearing against the periphery of the tube, one of the rollers having a groove therein on the periphery thereof to engage the wire, the groove being of a width such as to just straddle the wire, the opposite roller also having a wire-engaging groove in the periphery thereof offset with respect to the groove in the first roller.

11. In a machine of the class described, means for supporting and rotating a tube with a wire having spaced convolutions coiled thereabout, and means for covering the convolutions of wire with the tape, said means comprising a carriage movable lengthwise of the tube, a tape guide on the carriage, and means controlled by the convolutions of wire upon the tube for moving the carriage along the tube as the tube is rotated.

12. In a machine of the class described, means for supporting and rotating a tube with a wire having spaced convolutions coiled thereabout, and means for covering the convolutions of wire with the tape, said means comprising a carriage movable lengthwise of the tube, a tape guide on the carriage, means controlled by the convolutions of wire upon the tube for moving the carriage along the tube as the tube is rotated, and means on the carriage for pressing the tape onto the tube over the wire after said tape has been applied.

13. In a machine of the class described, means for supporting and rotating a tube with wire coiled thereabout with the convolutions of wire being spaced from one another, and means for covering the convolutions of wire with tape, said means comprising a carriage movable lengthwise of the tube, a trackway along which the carriage moves, a tape guide on the carriage, and rollers on the carriage adapted to bear against the periphery of the tube, said rollers having their axes diagonal to the longitudinal axis of the tube, whereby rotation of the tube imparts longitudinal travel to the carriage, said rollers having grooved peripheries, the groove of one roller being offset in a longitudinal direction with respect to the other.

14. A tape-applying machine of the class described comprising in combination, means for supporting and rotating a tube with a wire having spaced convolutions coiled thereabout, a carriage movable lengthwise of the tube and having a tape guide thereon for wrapping tape about the convolutions of wire as the tube is rotated, and means on the carriage for engaging the wire for propelling the carriage along the tube, said last-named means comprising opposed rollers on the carriage bearing against the periphery of the tube, one of the rollers having a groove therein to engage the wire, the axes of both rollers being inclined in the same direction with respect to the longitudinal axis of the tube.

15. The combination of a rotatable mandrel adapted to carry a rubber tube, means for holding a helical reinforcing member about the tube, a traveling roller standing directly opposite a turn of the helical member and adapted to coact with the successive turns of such member, and means for conducting tape between the traveling roller and the reinforcing member so that the opposite faces of the tape are engaged by the roller and member respectively, and means controlled by said member for advancing the roller.

16. A taping device for applying a tape in helical course to a stretched helical spring surrounding a foundation tube of flexible material comprising a traveling roller standing directly opposite a turn of the spring and adapted to coact with successive turns of the spring as the roller travels, and means for conducting tape between the traveling roller and the spring so that the opposite faces of the tape are engaged by the roller and spring respectively, and a roller adapted to engage a bare portion of the spring in advance of the tape applying roller, the said two rollers being mounted in a carriage movable axially of the tube.

17. The combination of a mandrel having a passageway within it leading to its exterior, an expansible tubular member surrounding the mandrel and attached to it on opposite sides of the orifice of such passageway, means adapted to engage the ends of a helical spring and hold it in stretched condition over the tubular member, and means for admitting fluid under pressure to the interior of the mandrel to pass to the space between the mandrel and tubular member.

ROBERT ELDON ROBERTS.

REFERENCES CITED

The following references are of record in the file of this patent:

UNITED STATES PATENTS

| Number | Name | Date |
| --- | --- | --- |
| 459,536 | Simon | Sept. 15, 1891 |
| 571,261 | Burchell | Nov. 10, 1896 |
| 1,149,224 | Sill | Aug. 10, 1915 |
| 1,414,091 | Merz | Apr. 25, 1922 |
| 1,478,083 | Whitmarsh | Dec. 18, 1923 |
| 1,913,327 | Barnes | June 6, 1933 |
| 2,272,704 | Harding | Feb. 10, 1942 |

FOREIGN PATENTS

| Number | Country | Date |
| --- | --- | --- |
| 23,632 | Great Britain, 1897 | Sept. 17, 1898 |
| 598,561 | Germany | May 24, 1934 |
| 697,536 | Germany | Jan. 23, 1937 |